United States Patent
Schneidewend

(10) Patent No.: US 9,550,152 B2
(45) Date of Patent: Jan. 24, 2017

(54) POINT OF USE FILTRATION SYSTEM WITH BACKWASH

(71) Applicant: Tedd Michael Schneidewend, Milwaukee, WI (US)

(72) Inventor: Tedd Michael Schneidewend, Milwaukee, WI (US)

(73) Assignee: Pentair Residential Filtration, LLC, Glendale, WI (US)

( * ) Notice: Subject to any disclaimer, the term of this patent is extended or adjusted under 35 U.S.C. 154(b) by 52 days.

(21) Appl. No.: 14/201,052

(22) Filed: Mar. 7, 2014

(65) Prior Publication Data

US 2014/0251905 A1   Sep. 11, 2014

Related U.S. Application Data

(60) Provisional application No. 61/774,491, filed on Mar. 7, 2013.

(51) Int. Cl.

| | |
|---|---|
| *B01D 65/02* | (2006.01) |
| *C02F 9/00* | (2006.01) |
| *B01D 61/14* | (2006.01) |
| *B01D 61/16* | (2006.01) |
| *B01D 61/22* | (2006.01) |
| *C02F 1/44* | (2006.01) |

(Continued)

(52) U.S. Cl.
CPC ............ *B01D 65/02* (2013.01); *B01D 61/145* (2013.01); *B01D 61/147* (2013.01); *B01D 61/16* (2013.01); *B01D 61/22* (2013.01); *C02F 9/005* (2013.01); *B01D 2311/14* (2013.01); *B01D 2321/04* (2013.01); *C02F 1/001* (2013.01); *C02F 1/444* (2013.01); *C02F 2103/04* (2013.01); *C02F 2201/005* (2013.01); *C02F 2201/009* (2013.01); *C02F 2209/005* (2013.01); *C02F 2209/03* (2013.01); *C02F 2303/16* (2013.01)

(58) Field of Classification Search
None
See application file for complete search history.

(56) References Cited

U.S. PATENT DOCUMENTS

| | | | | |
|---|---|---|---|---|
| 3,746,640 | A * | 7/1973 | Bray | B01D 61/08 210/321.69 |
| 3,959,146 | A * | 5/1976 | Bray | B01D 61/08 210/257.2 |
| 3,992,301 | A | 11/1976 | Shippey et al. | |

(Continued)

*Primary Examiner* — Bobby Ramdhanie
*Assistant Examiner* — Michael An
(74) *Attorney, Agent, or Firm* — Quarles & Brady LLP

(57) ABSTRACT

A system and method for a point of use filtration system with backwash is provided. The system includes a first filtration element, a tank, and a second filtration element positioned downstream from the tank. A first and second valve are each positioned downstream from the first filtration element. A first control line is coupled to a first control switch or a first permeate line and the first valve, and a second control line is coupled to the second control switch or a second permeate line and the second valve. When the point of use demands permeate water, the first and second pressure drops cause the first and second valves to open so water from the tank flows in a reverse direction to backwash the first filtration element and exit through the first and second valves to the drain, while water from the tank simultaneously flows through the second filtration element to the point of use.

20 Claims, 1 Drawing Sheet

(51) Int. Cl.
*C02F 1/00* (2006.01)
*C02F 103/04* (2006.01)

(56) References Cited

U.S. PATENT DOCUMENTS

| | | | |
|---|---|---|---|
| 4,193,872 A * | 3/1980 | Parkinson | B01D 61/08 |
| | | | 210/143 |
| 4,678,565 A | 7/1987 | Norton | |
| 4,976,876 A | 12/1990 | Diman et al. | |
| 4,986,918 A | 1/1991 | Breslau et al. | |
| 5,254,243 A | 10/1993 | Carr et al. | |
| RE35,564 E | 7/1997 | Gerulis | |
| 5,958,243 A | 9/1999 | Lawrence et al. | |
| 6,001,254 A * | 12/1999 | Espenan | B01D 65/02 |
| | | | 210/257.2 |
| 6,077,422 A | 6/2000 | Ryles | |
| 6,120,688 A | 9/2000 | Daly et al. | |
| 6,159,373 A | 12/2000 | Beck et al. | |
| 6,183,647 B1 * | 2/2001 | Aalto | B01D 61/14 |
| | | | 210/321.69 |
| 6,562,246 B2 | 5/2003 | McGowan | |
| 6,589,426 B1 | 7/2003 | Husain et al. | |
| 6,799,687 B1 * | 10/2004 | Schon | B01D 29/117 |
| | | | 210/333.1 |
| 6,814,861 B2 | 11/2004 | Husain et al. | |
| 7,070,695 B2 | 7/2006 | Husain et al. | |
| 7,378,024 B2 | 5/2008 | Bartels et al. | |
| 7,402,240 B2 * | 7/2008 | Kung | B01D 61/12 |
| | | | 210/110 |
| 7,422,690 B2 * | 9/2008 | Scharstuhl et al. | 210/636 |
| 2002/0179545 A1 * | 12/2002 | Rosenberger et al. | 210/806 |
| 2003/0019800 A1 * | 1/2003 | Romanyszyn et al. | 210/90 |
| 2004/0007527 A1 * | 1/2004 | Pedersen et al. | 210/650 |
| 2005/0067341 A1 * | 3/2005 | Green | B01D 61/022 |
| | | | 210/321.69 |
| 2011/0257788 A1 * | 10/2011 | Wiemers et al. | 700/267 |

* cited by examiner

POINT OF USE FILTRATION SYSTEM WITH BACKWASH

BACKGROUND

Water purification and filtration systems often include ultrafiltration membranes that, over time, accumulate colloidal and suspended particles, which leads to membrane fouling. Many water filtration systems have a backwash cycle to backwash the upstream side of the filtration membrane to remove any of the accumulated reject materials from the feed water to reduce fouling. However, many existing systems use an alternative flush liquid or feed water for backwashing purposes, rather than the already filtered water, in order to reduce premature fouling. Further, many existing systems also use a tank or accumulator to store the ultra-filtered water until needed at the point of use. Over time, bacteria can be produced in the tank, resulting in unsafe drinking water being provided to the user if there is no post-filter provided to clean water being directed out of the tank. Also, most water filtration systems with a backwash cycle require the use of power because of their dependency on either electronically controlled valves, or pressurized gas for backwashing, which makes ultrapure drinking water difficult to acquire in areas with unreliable power systems or with no power at all.

Not only do existing filtration systems require electricity or an additional power source to operate during the backwash cycles, but power is also required during other operational cycles, such as a service cycle and a tank fill cycle, which results in additional operational costs. Also, many purification and filtration systems require multiple accumulator tanks. Typically, one accumulator tank is used to provide water for a backwash cycle, and another tank is used to provide purified water to the point of use, thus adding additional manufacturing costs to the overall system. Additionally, many systems, such as reverse osmosis systems, generate a significant amount of waste water which is inefficient and costly, especially for point of use and residential purification and filtration systems. Lastly, conventional purification and filtration systems typically remove viruses and bacteria from the service water prior to being stored in the system's tank. Thus, there is a higher potential for the service water to be unsafe for drinking due to bacteria that may have been produced in the tank.

One known system discloses an automatic flushing and cleaning system for membrane separation machines such as reverse osmosis machines having plural modules or membranes. Cleaning may be by way of reducing the pressure to allow the membrane to relax, by the injection of air or inert gas to provide turbulence, and/or by injection of flushing liquid which may include chemical cleaning additives. Pumps, automatic valving, and pressure controls are provided, along with a complete time operated electrical sequencing system whereby desired purging, flushing and cleaning cycles are automatically undertaken at periodic intervals or in response to one or more preferred conditions.

Another system provides a membrane filtration system for the separation of solute, colloidal particles, and suspended matter from solutions. The membrane filtration system includes an operation mode and a backwashing mode. A process pump provides suction or negative pressure to the process side of a separation module allowing filtrate to flow from the system tank to the membrane during the backwashing mode, while keeping the filtrate stream separate from the process stream, thereby requiring the user of electrical power to operate the backwash mode.

Similarly, a membrane filtration system uses pump speed controllers to control flow rate and pressure during both a filtration cycle and a backwash cycle. The pump speed controllers operate by changing the frequency of AC current delivered to the pump motors, which changes the flow rate by changing the speed of the pump motor. While pressure and flow pulses are provided throughout the filtration and backwash cycles to dislodge foulants from the membrane, the filtration system requires the use of electrical power. Additionally, the filtration system requires two storage tanks, namely, one for backwash fluid and another for permeate water.

Another system provides a filter backflushing system including an accumulator containing a pressurized bladder which propels a supply of backwash fluid contained within the accumulator in a reverse direction through a filter element to remove clogging contaminants from the filter element. The system only includes a single filter element for the permeate water to flow through prior to storage in the accumulator tank. No other filters are used to clean the permeate water that flows from the accumulator tank to the point of use.

Therefore, it would be desirable to provide a system and method that addresses one or more of the needs described above. More particularly, it would be desirable to provide a system that uses a single accumulator tank capable of simultaneously providing backwash fluid for a first filtration membrane, such as an ultrafiltration membrane, and ultrapure water to a point of use. It would also be desirable to provide a filtration system that mechanically (i.e., requires no power) provides backwash that is a higher transmembrane pressure then the filtering transmembrane pressure, which is caused by opening a faucet which creates a large pressure drop. A system that provides biologically safe drinking water by removing viruses before the water enters the accumulator tank and removing bacteria after the water leaves the accumulator tank is also desirable. Also, providing an ultrafiltration membrane as a prefilter to a microfiltration membrane to protect the microfiltration membrane from fouling is also desirable, as well as a system that uses less waste water than RO systems on the point of use level.

SUMMARY OF THE INVENTION

Embodiments of the disclosure provide a system and method for providing water to a point of use. In some embodiments, the system includes a first filtration element positioned downstream from the feed water line and a tank positioned downstream from the first filtration element. A second filtration element is positioned downstream from the tank and a first valve is positioned downstream from the first filtration element and upstream from a drain. A second valve is positioned downstream from the first valve and upstream from the drain. A first control line is coupled to a first control switch or a first permeate line and the first valve, and a second control line is coupled to a second control switch or a second permeate line and the second valve. The first control line senses a first pressure drop and the second control line senses a second pressure drop. The first pressure drop is less than the second pressure drop due to a backpressure provided by the first and second filter elements. When permeate water is demanded at a point of use, a first pressure drop in the first control line causes the first valve to open and a second pressure drop in the second control line causes the second valve to open so that water from the tank flows in a reverse direction through the first filtration element to backwash the first filtration element, and through the first valve and the second valve to the drain, while water from the tank simultaneously flows through the second filtration element to the point of use.

In one embodiment, the system is adapted to be installed in an environment without electrical power, and the system may be adapted to be installed under a kitchen countertop. The system may provide a ratio of about 4 to about 1 of ultrapure water to waste water. The tank may be a pressurized accumulator tank, and in one embodiment, a flow restrictor may be coupled to the feed water line. The first filtration element may be an ultrafiltration element capable of removing viruses from feed water provided by the feed water line, and the second filtration element may be a microfiltration element capable of removing bacteria from water pre-filtered by the ultrafiltration element. In some embodiments, the first valve is a normally closed valve and the second valve is a normally open valve. In other embodiments, the first valve and the second valve are mechanical pressure switches. Pressure in the first control line may increase to open the first valve and pressure in the second control line may decreases to open the second valve. The first control line and the second control line may be coupled to the first permeate line and the second permeate line using a T-coupling.

In one embodiment, the system operates to simultaneously provide permeate water to the point of use and to backwash the first filtration element without the use of electrical power. The backwash of the first filtration element may occur automatically whenever the point of use demands water and simultaneously as permeate water is provided to the point of use. The backwash of the first filtration element may automatically stop when demand by the point of use ceases. The backwash through the first filtration element may occur at a first transmembrane pressure that is higher than a second transmembrane pressure during filtration through the first filtration element. In addition, the first control switch may activate the first valve and the second control switch may activate the second valve at a pressure set point in the first and second control lines, which in one embodiment, may be substantially rigid fluid lines. In some embodiments, the pressure set point is about 10 PSI, and in other embodiments, the pressure set point is adjustable.

One embodiment of a method for providing filtered water includes the step of providing a first control line coupled to a first valve and a second control line coupled to a second valve. The method further includes the steps of decreasing a first pressure in the first control line and decreasing a second pressure in the second control line when water is demanded at a point of use. The second pressure in the second control line decreases at a rate more than the rate of the first pressure in the first control line due to a backpressure provided by a first filtration element and a second filtration element, which opens the first valve due to the first pressure decrease and opens the second valve due to the second pressure decrease. The method also includes the step of causing water from a tank to flow in a reverse direction through the first filtration element to backwash the first filtration element and through the first and the second valves to a drain. Water from the tank simultaneously flows through a second filtration element to the point of use during the backwash.

Another embodiment of the disclosure provides a system for providing water to a point of use, the system includes a feed water line, a drain, and a permeate line to the point of use. In some embodiments, the system includes a first filtration element positioned downstream from the feed water line and a tank positioned downstream from the first filtration element. A second filtration element is positioned downstream from the tank and a first valve is positioned downstream from the first filtration element and upstream from the drain. A second valve is positioned downstream from the first valve and upstream from the drain and a first control switch is positioned upstream from the second filtration element and is coupled to the permeate line. A second control switch is positioned downstream from the second filtration element and is coupled to the permeate line. A first control line is coupled to the first control switch and the first valve, and a second control line is coupled to the second control switch and the second valve. The first control switch senses a first pressure drop in the first control line and the second control switch senses a second pressure drop in the second control line. The first pressure drop is less than the second pressure drop due to a backpressure provided by the first and second filter elements. When the point of use demands permeate water, the first pressure drop in the first control line causes the first valve to open. The second pressure drop in the second control line causes the second valve to open so that water from the tank flows in a reverse direction through the first filtration element to backwash the first filtration element and through the first valve and the second valve to the drain. Simultaneously, water from the tank flows through the second filtration element to the point of use.

These and other features, aspects, and advantages of the present invention will become better understood upon consideration of the following detailed description, drawings, and appended claims.

DETAILED DESCRIPTION

Figure 1:
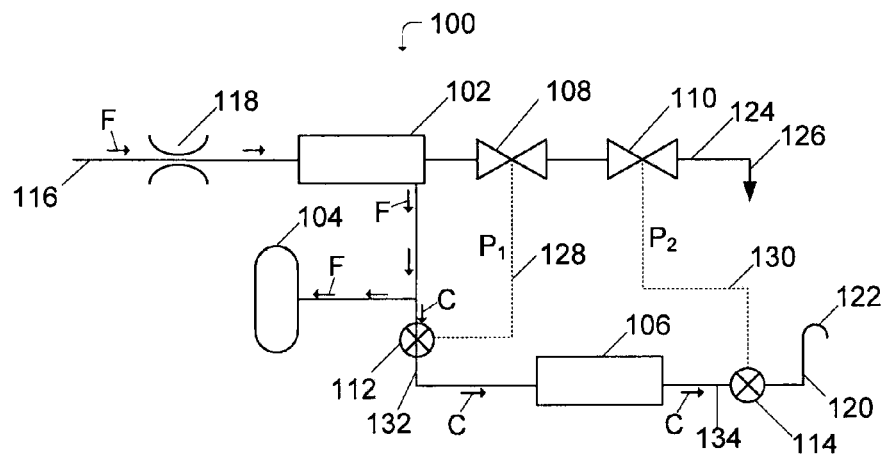
FIG. 1 is a schematic diagram of a flow path during stagnation and a tank fill cycle where a normally closed valve is closed and a normally open valve is closed according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a point of use filtration system 100 according to one embodiment. The filtration system 100 generally includes a first filtration or ultrafiltration element 102, an accumulator tank 104, a second filtration or microfiltration element 106, a normally closed valve 108, a normally open valve 110, a first control switch 112, and a second control switch 114. Feed water F can enter the system 100 through a feed water line 116 that is fluidly coupled to a flow restrictor 118 and the ultrafiltration element 102. Ultrapure water may exit the system 100 through a permeate line 120 and a faucet 122 (or any point of use device), which are downstream from the second control switch 114. Concentrate exits the system 100 through a drain line 124, which is fluidly coupled to the normally closed valve 108 and the normally open valve 110, to a drain 126. The filtration system 100 is generally provided to remove debris from the feed water F using various mechanisms described herein, and to provide water that meets at least minimum standards of water quality and/or is safe to drink.

The first filtration element 102 is provided to filter debris from the feed water F. In particular, the first filtration element 102 is provided in the form of an ultrafiltration element 102, which allows for removal of suspended solids including particles, colloids, cysts, bacteria, and viruses. Ultrafiltration elements may remove suspended solids based on pore size. The ultrafiltration element 102 can have a pore size from about 0.0001 microns to about 0.1 microns. Alternatively, the first filtraton element 102 can be a microfiltration or nanofiltration element. In one embodiment, the ultrafiltration element 102 may be housed inside a membrane housing and constructed from a polyethersulfone, modified (PESM) material. The ultrafiltration element 102 may be a hollow-fiber ultrafiltation membrane having a multi-bore membrane structure, for example, which combines several capillaries into a single resistant structure to help inhibit fiber breakage. One suitable first filtration element 102 is an ultrafilter sold under the Homespring® brand by Pentair Residential Filtration (Wisconsin).

Downstream from the ultrafiltration element 102 is the accumulator tank 104 and the microfiltration element 106. The accumulator tank 104 may be provided in the form of a pressurized accumulator tank. For example, in one embodiment, the accumulator tank 104 may be constructed of a steel shell surrounding a plastic lining. In a different embodiment, the accumulator tank 104 may be provided as a fiberglass wound shell surrounding an inner shell molded of a polymeric material. Any suitable accumulator tank, however, may be used with the filtration system 100. The accumulator tank 104 typically is defined by a size and a range of about 2 gallons to about 3.2 gallons for point of use applications, however larger accumulator tanks are contemplated for commercial or industrial filtration systems. The position of the accumulator tank 104, between the ultrafiltration element 102 and the microfiltration element 106, allows for a flushing system that mechanically provides both a backwash cycle for the ultrafiltration element 102 and an acceptable end flow and delivery of ultrapure water to the user at the point of use 122, as described in more detail below.

The second filtration element 106 is provided downstream of the accumulator tank 104 to filter debris from the concentrate. In particular, the second filtration element 106 is provided in the form of a microfiltration element 106 which allows for removal of suspended solids including sediment, algae, protozoa, and bacteria. Similar to ultrafiltration elements, microfiltration elements may remove suspended solids based on pore size. The microfiltration element 106 can be defined by a pore size from about 0.1 microns to about 10 microns. Alternatively, the microfiltration element 106 can be an ultrafiltration or nanofiltration element. In one embodiment, the microfiltration element 106 may be housed inside a membrane housing and constructed from a polymeric material, such as polysulfone, polyethersulfone, polypropylene, polyvinylidene fluoride, nylon, or the like. The microfiltration element 106 may be constructed of a hollow-fiber microfiltration membrane. One suitable second filtration element 106 is a microfilter sold under the Fiberdyne® brand of Pentair Residential Filtration (Wisconsin).

Fluidly coupled to the microfiltration element 106 upstream is the first control switch 112 and fluidly coupled to the microfiltration element 106 downstream is the second control switch 114. The first control switch 112 is coupled to the normally closed valve 108 by a first control line 128. The first control switch 112 is positioned downstream from the ultrafiltration element 102 and upstream from the microfiltration element 106. The second control switch 114 is coupled to the normally open valve 110 by a second control line 130. The second control switch 114 is positioned downstream from the microfiltration element 106 and upstream from the faucet 122. The first control line 128 and/or the second control line 130 may be substantially rigid fluid lines. In another embodiment, both the first control line 128 and the second control line 130 may be coupled to a first permeate line 132 and a second permeate line 134 by, for example, using a T-coupling, so that the first control switch 112 and the second control switch 114 are no longer present.

If present in the filtration system 100, the first control switch 112 and the second control switch 114 may be provided in the form of pressure control switches. The pressure control switches can be connected to the normally closed valve 108 and the normally open valve 110. The pressure control switches may each include a piston that, depending on the pressure in the first control line 128 and the second control line 130, moves to operate the first control switch 112 and the second control switch 114, respectively. The pressure control switches also may include a spring that is calibrated to determine how much pressure is required to move the piston. Thus, the spring may be calibrated to actuate the mechanical switch contact within the pressure switch at a pressure above or below a pressure set point (e.g., about 68.95 kPa). However, in one embodiment, the first control switch 112 and the second control switch 114 may be three-way connectors or T-couplings, for example, which provide a break in the first permeate line 132 and the second permeate line 134, respectively. Thus, pressure in the first control line 128 will be substantially the same as the pressure in the first permeate line 132, and the pressure in the second control line 130 will be substantially the same as the pressure in the second permeate line 134.

In one embodiment, the first and second control switches 112, 114 can be electrically connected to the normally closed valve 108 and the normally open valve 110, respectively. A controller (not shown) can cause the first and second control switches 112, 114 to force the filtration system 100 into a backwash cycle, for example, by causing pressure in the control lines 128, 130 to open both the normally closed valve 108 and the normally open valve 110. In some embodiments, the controller can cause the first and second control switches 112, 114 to force the filtration system 100 into a tank fill cycle, for example, to ensure that adequate water is available for service and backwash cycles. In some embodiments, the controller can monitor the accumulated time and/or flow since the last backwash cycle and can periodically cause the normally closed valve 108 and the normally open valve 110 to open by actuating the first and second control switches 112, 114.

In one embodiment, the point of use filtration system 100 can use the ultrafiltration element 102 as a pre-filter to the microfiltration element 106. This embodiment inhibits the microfiltration element 106 from fouling, while cleaning the ultrafiltration element 102 in the backwash cycle, as will be described in more detail below. Also, by using the accumulator tank 104 to deliver water through the microfiltration element 106, the system 100 can provide ultrapure water at open flow without the concerns of premature fouling in order to provide biologically safe drinking water. Biologically safe drinking water can be provided by first removing any viruses from the feed water F through the ultrafiltration element 102 before reaching the accumulator tank 104, and then by removing any bacteria that exists in the feed water F using the microfiltration element 106 after exiting the accumulator tank 104.

The normally closed valve 108 and the normally open valve 110 are fluidly coupled to the first control line 128 and the second control line 130, respectively. The normally closed valve 108 and the normally open valve 110 may be fully mechanical valves, for example mechanical pressure switches, and are also adapted to be fluidly coupled to the drain line 124. The normally closed valve 108 and the normally open valve 110 may be switched from the open to closed position, and vice versa, due to pressure change in the system. More particularly, a pressure set point may be defined by the system 100 (e.g., by the controller) and/or by a calibrated spring, for example, inside the normally closed valve 108 and the normally open valve 110. The pressure set point is the threshold amount of pressure required to actuate the normally closed valve 108 and the normally open valve 110.

Generally, the normally closed valve 108 begins operation in the closed position. Once the system or control line pressure is greater than the pressure set point, the normally closed valve 108 moves to an open position. One way the system or control line pressure becomes greater than the pressure set point is due to opening and/or closing of the faucet 122 in the filtration system 100. More specifically, if the system or control line pressure is less than the pressure set point, the normally closed valve 108 will remain in a closed position. Additionally, the normally open valve 110 begins operation in the open position. Once the system or control line pressure is greater than the pressure set point, the normally open valve 110 moves to a closed position. More specifically, if the system or control line pressure is less than the pressure set point, the normally open valve 110 will remain in an open position.

The embodiment shown in FIG. 1 illustrates the flow of feed water F in the point of use filtration system 100 during periods of stagnation or during a tank fill cycle. During the tank fill cycle, the normally closed valve 108 is closed due to a first pressure $P_1$ in the first control line 128, and the normally open valve 110 is closed due to a second pressure $P_2$ in the second control line 130. The pressure $P_1$ in the first control line 128 is less than the pressure $P_2$ in the second control line 130. Until the point of use filtration system 100 is fully installed and operational, the normally closed valve 108 and the normally open valve 110 can be suitable manual valves. When the pressure $P_1$ in the first control line 128 and the pressure $P_2$ in the second control line 130 are above a pressure set point (e.g., 10 PSI), the normally closed valve 108 is open and the normally open valve 110 is closed. When the pressure $P_1$ in the first control line 128 and the pressure $P_2$ in the second control line 130 are both below the pressure set point, the normally closed valve 108 is closed and the normally open valve 110 is open. Fluctuation of the pressure set point is minimal as the operating pressure varies.

As shown in FIG. 1, during the tank fill cycle, the faucet 122 is closed and the feed water F enters the point of use filtration system 100 through the feed water line 116 and flows through the flow restrictor 118, as indicated by arrows representing flow path F. The flow restrictor 118 allows for adjustments in the amount of flushing that the point of use filtration system 100 needs. In another embodiment, a normally closed valve (not shown) can be used rather than the flow restrictor 118. In a further embodiment, the flow restrictor 118 can be omitted and/or another device may be substituted to regulate feed water flow into the system 100.

As the feed water passes through the ultrafiltration element 102, permeate water fills and pressurizes the accumulator tank 104 downstream until the pressure in the accumulator tank 104 is equal to the pressure in the feed water line 116. Permeate water continues to flow, as indicated by arrows representing flow path C, past the accumulator tank 104 through the first permeate line 132, through the microfiltration element 106, and the second permeate line 134, thereby providing pressure to the first control line 128 and the second control line 130. However, the first pressure $P_1$ in the first control line 128 does not reach the pressure set point, which causes the normally closed valve 108 to remain closed at the drain line 124 due to the first control switch 112 not being activated. Once the second pressure $P_2$ in the second control line 130 reaches the pressure set point, the second control switch 114 is activated and the normally open valve 110 closes at the drain line 124, as shown in FIG. 1. The above described tank fill cycle runs until pressure is equalized. Namely, the pressure in the accumulator tank 104 is equal to the pressure in the feed water line 116. In one embodiment, the equalized pressure may be about 36 PSI.

Figure 2:
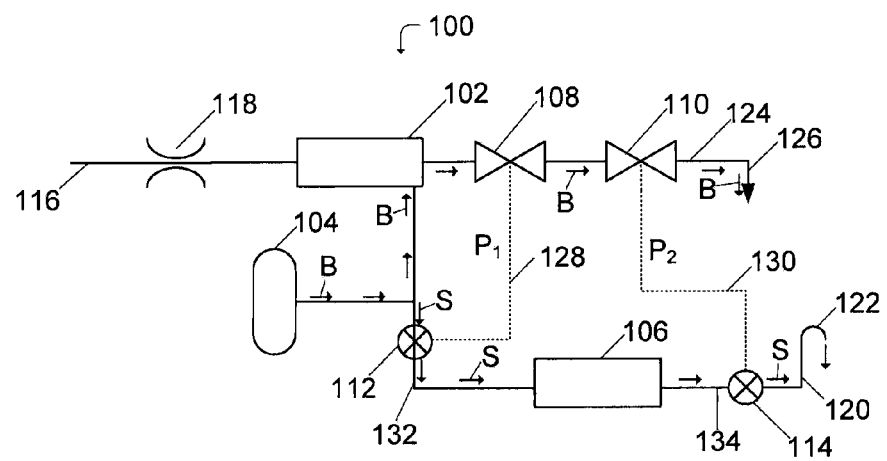
FIG. 2 is a schematic diagram of the flow path of FIG. 1 during a service cycle and a backwash cycle according to one embodiment.

FIG. 2 illustrates the flow of feed water during the service, or in use, cycle of the point of use filtration system 100. The service cycle can begin whenever the user opens the faucet 122, which causes a first pressure drop in the first control line 128 and a second pressure drop in the second control line 130. The first pressure drop in the first control line 128 is less than the second pressure drop because of the back-pressure provided by the ultrafiltration element 102 and/or the microfiltration element 106, which causes the normally closed valve 108 at the drain 126 to open in absence of power. Thus, the first pressure drop in the first control line 128 causes the first pressure $P_1$ to remain above the pressure set point. The second pressure drop in the second control line 130 causes the normally open valve 110 at the drain 126 to open, such that the second pressure drop in the second control line 130 causes the second pressure $P_2$ to fall below the pressure set point. The actuation of the valves 108 and 110 will substantially, immediately, and/or automatically cause a portion of the accumulated pressurized water in the accumulator tank 104 to flow upstream to mechanically put the ultrafiltration element 102 into a backwash cycle, as indicated by arrows representing flow path B.

The backwash cycle has a higher trans-membrane pressure (TMP) than the filtering TMP through the ultrafiltration element 102. More specifically, by using the accumulator tank 104 to collect the ultrapure water from the ultrafiltration element 102, the TMP on the membrane of the ultrafiltration element 102 remains very low and can reduce the rate of fouling. Any concentrate remaining from the backwash cycle can exit the point of use filtration system 100 through the drain line 124 and the normally closed valve 108 and the normally open valve 110 to the drain 126. Another portion of accumulated pressurized water in the accumulator tank 104 will flow downstream to provide service water, as indicated by arrows representing flow path S, that will pass through the microfiltration element 106 before exiting through the permeate line 120 and the faucet 122.

In one embodiment, during the backwash cycle shown in FIG. 2, substantially the same amount of the ultrapure water from the accumulator tank 104 is used for the backwash cycle B and the service water S provided to the point of use. In another embodiment, initially, at the beginning of the backwash cycle, a smaller portion (e.g., less than about 50%) of the ultrapure water from the accumulator tank 104 is used for the backwash cycle B and a larger portion (e.g., more than about 50%) of the ultrapure water from the accumulator tank 104 is used for the service water S provided to the point of use, which is due to the higher initial pressure $P_1$ in the first control line 128. As long as the permeate water is being dispensed through the permeate line 120 and the faucet 122 is open, the ultrafiltration element 102 will be in a backwash cycle. However, as the pressure in the accumulator tank 104 decreases, due to the ultrapure water exiting the accumulator tank 104, the pressure $P_1$ in the first control line 128 slowly decreases, which may cause the normally closed valve 108 to close, even though the faucet 122 is open, due to the pressure $P_1$ falling below the pressure set point. Once the faucet 122 is closed, backwashing will automatically stop, and the pressure will increase in the first control line 128 and the second control line 130, causing the valves 108 and 110 to actuate back to the closed positions, as illustrated in FIG. 1.

The point of use filtration system 100 uses significantly less wastewater than a conventional residential reverse osmosis (RO) system. Typically, residential RO systems provide about 1 gallon of water for every 5 gallons of waste water. During experimental testing, the point of use ultrafiltration system 100 disclosed herein provided about 1 gallon of ultrapure water for every ⅕ gallon of waste water. The filtration system 100 provides a ratio of about 4 to about 1 of ultrapure water to waste water. In a different embodiment, the filtration system 100 provides a ratio of about 3 to about 1 of ultrapure water to waste water. In other embodiments, the filtration system 100 provides a ratio of about 3 to about 2 of ultrapure water to waste water. In a further embodiment, the filtration system 100 provides a ratio of about 1 to about 1 of ultrapure water to waste water. The filtration system 100 provides significantly less waste water than many known RO systems.

Further, the point of use filtration system 100 fulfills the need of a non-electrical solution for backwashing an ultrafiltration element 102 for the point of use market and the need for biologically safe drinking water. As discussed herein, the filtration system 100 is fully functional without the need for a power source. The filtration system 100 can be used, for example, under a countertop or sink in a kitchen or bathroom in areas of unreliable power systems or areas with no power at all. The point of use ultrafiltration system 100 can also function without the risk of premature reduction in flow due to poor influent conditions as seen in less developed countries. In another embodiment, the filtration system 100 may be implemented into commercial or industrial applications on a larger scale.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A system for providing water to a point of use, the system including a feed water line, a drain, and a permeate line to the point of use, the system comprising:
   a first filtration element positioned downstream from the feed water line;
   a tank positioned downstream from the first filtration element;
   a second filtration element positioned downstream from the tank;
   a first valve positioned downstream from the first filtration element and upstream from the drain;
   a second valve positioned downstream from the first valve and upstream from the drain;
   a first control line coupled to a first permeate line and the first valve; and
   a second control line coupled to a second permeate line and the second valve;
   the first control line sensing a first pressure drop, the second control line sensing a second pressure drop, the first pressure drop being less than the second pressure drop due to a backpressure provided by the first and second filter elements;
   when the point of use demands permeate water, the first pressure drop in the first control line causing the first valve to open and the second pressure drop in the second control line causing the second valve to open so that water from the tank flows in a reverse direction through the first filtration element to backwash the first filtration element and through the first valve and the second valve to the drain while water from the tank simultaneously flows through the second filtration element to the point of use.

2. The system of claim 1, wherein the first valve is a normally closed valve and the second valve is a normally open valve.

3. The system of claim 1 further comprising a flow restrictor coupled to the feed water line.

4. The system of claim 1, wherein the first filtration element is an ultrafiltration element capable of removing viruses from feed water provided by the feed water line and the second filtration element is a microfiltration element capable of removing bacteria.

5. The system of claim 4, wherein the microfiltration element is capable of removing bacteria from water prefiltered by the ultrafiltration element.

6. The system of claim 1, wherein the system operates to simultaneously provide permeate water to the point of use and to backwash the first filtration element, both without the use of electrical power.

7. The system of claim 1, wherein the system operates without any electrical power.

8. The system of claim 1, wherein the backwash through the first filtration element occurs at a first transmembrane pressure that is higher than a second transmembrane pressure during filtration through the first filtration element.

9. The system of claim 1, wherein the first control line activates the first valve and the second control line activates the second valve at a pressure set point in the first and second control lines.

10. The system of claim 9, wherein the pressure set point is about 10 PSI.

11. The system of claim 10, wherein the pressure set point is defined by at least one of the normally open valve and the normally closed valve.

12. The system of claim 1, wherein the backwash of the first filtration element occurs automatically whenever the point of use demands water and simultaneously as permeate water is provided to the point of use.

13. The system of claim 1, wherein the backwash of the first filtration element automatically stops when demand by the point of use ceases.

14. The system of claim 1, wherein the system provides a ratio of about 4 to about 1 of ultrapure water to waste water.

15. A method of providing water to a point of use from a filtration system, the filtration system including a feed water line, a drain, and a permeate line to the point of use, the method comprising:
providing a first control line coupled to a first valve positioned downstream from a first filter element and upstream from the drain and a second control line coupled to a second valve positioned downstream from the first valve and upstream from the drain;
decreasing a first pressure in the first control line and decreasing a second pressure in the second control line when the point of use demands water, the second pressure in the second control line decreasing at a rate more than the rate of the first pressure in the first control line due to a backpressure provided by the first filter element and a second filter element;
opening the first valve due to the first pressure decrease;
opening the second valve due to the second pressure decrease;
causing water from a tank to flow in a reverse direction through a first filtration element to backwash the first filtration element and through the first valve and the second valve to the drain; and
substantially simultaneously causing water from the tank to flow through a second filtration element to the point of use.

16. The method of claim 15 further comprising the step of simultaneously providing permeate water to the point of use and to backwash the first filtration element, both without the use of electrical power.

17. The method of claim 15 further comprising the step of backwashing the first filtration element at a first transmembrane pressure that is higher than a second transmembrane pressure occurring during filtration through the first filtration element.

18. The method of claim 15 further comprising activating the first valve and the second valve at a pressure set point in the control line.

19. The method of claim 15 further comprising automatically backwashing the first filtration element whenever the point of use demands water, and simultaneously providing permeate water to the point of use.

20. A system for providing water to a point of use, the system including a feed water line, a drain, and a permeate line to the point of use, the system comprising:
a first filtration element positioned downstream from the feed water line;
a tank positioned downstream from the first filtration element;
a second filtration element positioned downstream from the tank;
a first valve positioned downstream from the first filtration element and upstream from the drain;
a second valve positioned downstream from the first valve and upstream from the drain;
a first control switch positioned upstream from the second filtration element and coupled to the permeate line;
a second control switch positioned downstream from the second filtration element and coupled to the permeate line;
a first control line coupled to the first control switch and the first valve; and
a second control line coupled to the second control switch and the second valve, wherein water from the tank flows in a reverse direction through the first filtration element to backwash the first filtration element and through the first valve and the second valve to the drain while water from the tank simultaneously flows through the second filtration element to the point of use, wherein movement of water to the point of use and during backwash are both accomplished without the use of electrical power.

* * * * *